United States Patent [19]

Demeure

[11] Patent Number: 4,542,455

[45] Date of Patent: Sep. 17, 1985

[54] SIGNAL-PROCESSING MULTIPROCESSOR SYSTEM

[75] Inventor: Alain Demeure, Paris, France

[73] Assignee: Thomson-CSF, Paris, France

[21] Appl. No.: 517,986

[22] Filed: Aug. 1, 1983

Related U.S. Application Data

[63] Continuation of Ser. No. 151,689, May 20, 1980, abandoned.

[30] Foreign Application Priority Data

May 23, 1979 [FR] France ............................ 79 13199

[51] Int. Cl.⁴ .......................... G06F 15/16; G06F 9/46
[52] U.S. Cl. ................................................ 364/200
[58] Field of Search .............................. 364/200, 900

[56] References Cited

U.S. PATENT DOCUMENTS

| | | | |
|---|---|---|---|
| 3,480,914 | 11/1969 | Schlaeppi | 364/200 |
| 3,496,551 | 2/1970 | Driscoll et al. | 364/200 |
| 3,566,357 | 2/1971 | Ling | 364/200 |
| 3,593,300 | 11/1971 | Driscoll, Jr. et al. | 364/200 |
| 3,962,706 | 6/1976 | Dennis et al. | 364/200 |
| 4,224,664 | 9/1980 | Trischieri | 364/200 |

*Primary Examiner*—Eddie P. Chan
*Attorney, Agent, or Firm*—Oblon, Fisher, Spivak, McClelland & Maier

[57] ABSTRACT

A multiprocessor digital computation system for performing at least one signal-processing chain which includes a number of processes. Each process is executed by means of executing circuits including memories, computing operators and input-output couplers, which are interconnected by means of a bus system. The system includes a sequencer and an address and connection generator, wherein the sequencer includes plural process modules, one for each process to be executed, and indicates at each computing step the state of occupation or non-occupation of the executing circuits and allocates the executing circuits to execute a process to be executed upon availability of the resources necessary for execution of the process.

5 Claims, 7 Drawing Figures

SIGNAL-PROCESSING MULTIPROCESSOR SYSTEM

This application is a continuation of application Ser. No. 151,689, filed May 20, 1980, now abandoned.

BACKGROUND OF THE INVENTION

1. Field of the Invention

This invention relates to a multiprocessor system which employs the digital computation technique for signal processing.

A signal processing operation or a processing chain is intended to refer to a sequence of computing steps each designated as a process involving arithmetic and logical operations. These signal-processing operations are distinguished from conventional data-processing calculations by their repetitive character, by the simple structure of data handled and by their parallel operation capability. This type of processing is employed in particular in the fields of radar and sonar.

2. Description of Prior Invention

Many signal-processing systems of known types are endowed with the above-mentioned characteristics. Possible structures of these systems are described, for example, in an article by C. Bozzo (National symposium on signal-processing and its applications, Nice, June 16-21, 1975, page 559). In the field of signal-processing, however, it appears that systems of the multiprocessor type and more particularly of the type designated by the abbreviation M.I.M.D. (Multiple Instruction stream, Multiple Data stream) according to the classification proposed by Flyn (in IEEE transactions on computers, volume 21, No. 9, September 1972) are particularly well-suited to the characteristics mentioned in the foregoing and make it possible to increase the computing power and speed.

In a structure of this type, the different processes are therefore carried out in parallel by making use of so-called "execution means", this expression being adopted in the following description. Said execution means are constituted by specialized or microprogrammed arithmetic or logical operators, memories, and inputoutput couplers for establishing relations between the system and the exterior. Some of these execution means are specific to a well-determined process but the majority can be shared between a number of processes. The execution means of the last-named category are common to a number of processes and will be designated as resources.

In order to carry out a predetermined process, the execution means must be interconnected in a specific way. This interconnection of the execution means must not be fixed but must on the contrary be programmable in order to permit different recombinations of the execution means for subsequent processing operations. This result is achieved by connecting each of the execution means aforesaid to a single multiwire connection usually known as a bus.

By means of this structure, a number of processes can therefore take place simultaneously in parallel by having access to execution means which are at least partially common, thus entailing the need for arbitration in time.

One solution consists in centralizing this arbitration function within a control unit which accordingly delivers all the decisions which settle the problems of conflict and of synchronization. However, the disadvantage of this solution lies in the fact that the control unit becomes a bottleneck and consequently results in a waiting period of prohibitive length at the level of each process. It is always possible in such a case to increase the number of resources in order to prevent conflicts but this solution suffers from the obvious drawbacks of complexity and cost.

SUMMARY OF THE INVENTION

It is an object of the present invention to provide a signal-processing system which makes it possible to comply with these different requirements of speed and simplicity, especially by adopting a single-bus multiprocessor system and decentralization of the arbitration function. To this end, the system according to the invention includes circuits for continuously indicating the state of occupation of the resources which circuits are consulted independently by each process and permit or prohibit the performance of the consultant process as a function of the resources available at the instant of consultation.

According to the invention, there is provided a multiprocessor system for processing signals by means of a finite number of processes including:

circuits for executing the processes, including memories, computing operators and input-output couplers, which executing circuits can be at least partly utilized in alternate sequence by a plurality of processes;

a bus for transferring computing information between the executing circuits;

a controller for controlling the execution of the processes; wherein the controller includes a sequencer connected to an address and connection generator, the sequencer being constituted by a finite number of identical modules assigned to the processes in one-to-one correspondence, each module being constituted by memories and logic circuits which, in conjunction with a second bus common to all the modules, ensure time management of the assignment of the executing circuits to each process.

BRIEF DESCRIPTION OF THE DRAWINGS

Further aims, features and results of the invention will become apparent from the following description which is given by way of example and not in any limiting sense, reference being made to the accompanying drawings in which.

In these different figures, the same references relate to the same elements.

DESCRIPTION OF THE PREFERRED EMBODIMENTS

Figure 1:
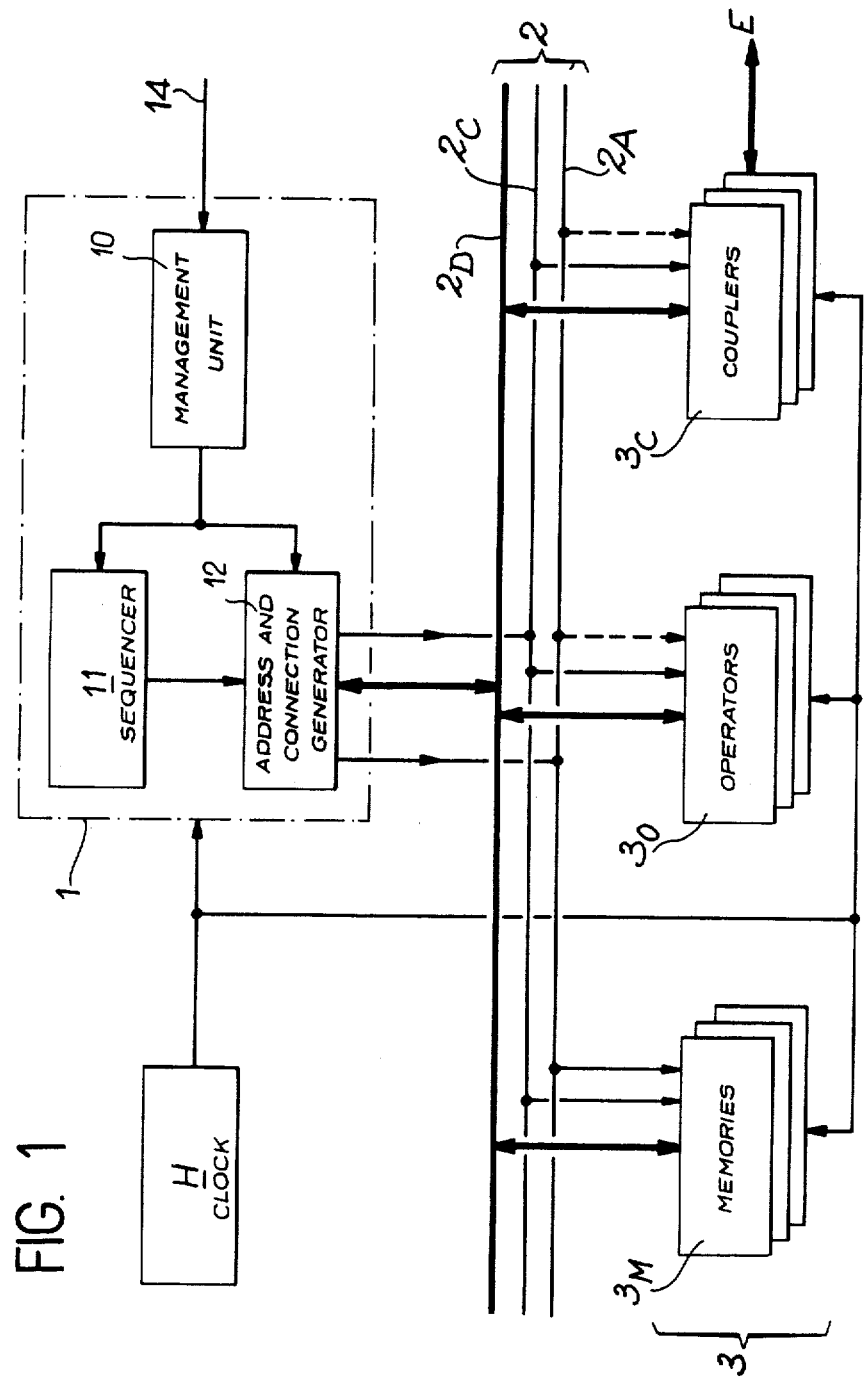
FIG. 1 is a diagram showing the general structure of the multiprocessor according to the invention.

In FIG. 1, there is therefore shown the general diagram of the system according to the invention. The system mainly comprises:

a group of execution means designated by the general reference 3;

a connecting system or bus designated by the general reference 2 between these different execution means;

a control unit 1.

As mentioned in the foregoing, the execution means 3 comprise:

a group of memories designated by the reference $3_M$;

a group of computation operators $3_O$ (arithmetic or logic);

a group of couplers $3_C$ for establishing the relations between the system and the exterior (E).

These different execution means $3_M$, $3_O$ and $3_C$ are of conventional type and of any desired number, both the type and number of execution means being usually adapted to the applications contemplated for the system.

The interconnection system 2 for said execution means 3 is composed of a bus in which the data flow and which is designated by the reference $2_D$, a bus in which the connection orders flow and which is designated by the reference $2_C$, and finally a bus which is given the reference $2_A$ and in which the memory-addressing data flow.

The memories $3_M$ are each connected to the data bus $2_D$, to the connection bus $2_C$ and to the addressing bus $2_A$; the operators $3_O$ are connected to the data bus $2_D$ and to the connection bus $2_C$ and possibly to the bus $2_A$ if the operator is programmable (connection shown in a dashed line in the figure); similarly, the couplers $3_C$ are connected to the bus $2_D$, to the bus $2_C$ and possibly also to the bus $2_A$. All these connections are established in a conventional manner and will therefore not be described in greater detail.

The control unit 1 comprises:

a management unit 10 for receiving from an external control 14 the indication of the processing operation to be performed on a signal; the intended function of the management unit is to associate the different processes constituting the requested processing chain; said unit is constructed in any known manner, for example by means of logical circuits or a microprocessor;

a sequencer 11 which has the design function of arbitrating conflicts of request for the same resource by a plurality of processes, by their access to the buses; said sequencer is controlled by the management unit 10 and is described in greater detail in the following figures;

an address and connection generator 12 having the function of generating the addresses and the connection orders which are necessary for the execution means 3 under the control of the elements 10 and 11; said generator is accordingly connected to the connection bus $2_C$ and to the addressing bus $2_A$ as well as to the data bus $2_D$.

The system according to the invention further comprises in conventional manner a clock H which is connected to the control unit and to each of the execution means 3.

It is recalled that, within the meaning defined above, a signal-processing chain is constituted by a predetermined number of computing steps known as processes. Each process is performed by means of a set of instructions constituting a program recorded in a program memory which is specific to each process and which can be located within the control unit 1, for example. Execution of processes takes place in each case in a sequential manner and instruction by instruction, either for one process or for another, depending on the state of available resources.

The function of the sequencer 11 is to determine at each period of the clock H the process for which an instruction can be executed; said sequencer then transmits the address to the generator 12 which, according to the instruction itself, is intended on the one hand to establish the connections to the execution means 3 and on the other hand to carry out computation of the addresses of the data.

Figure 2:
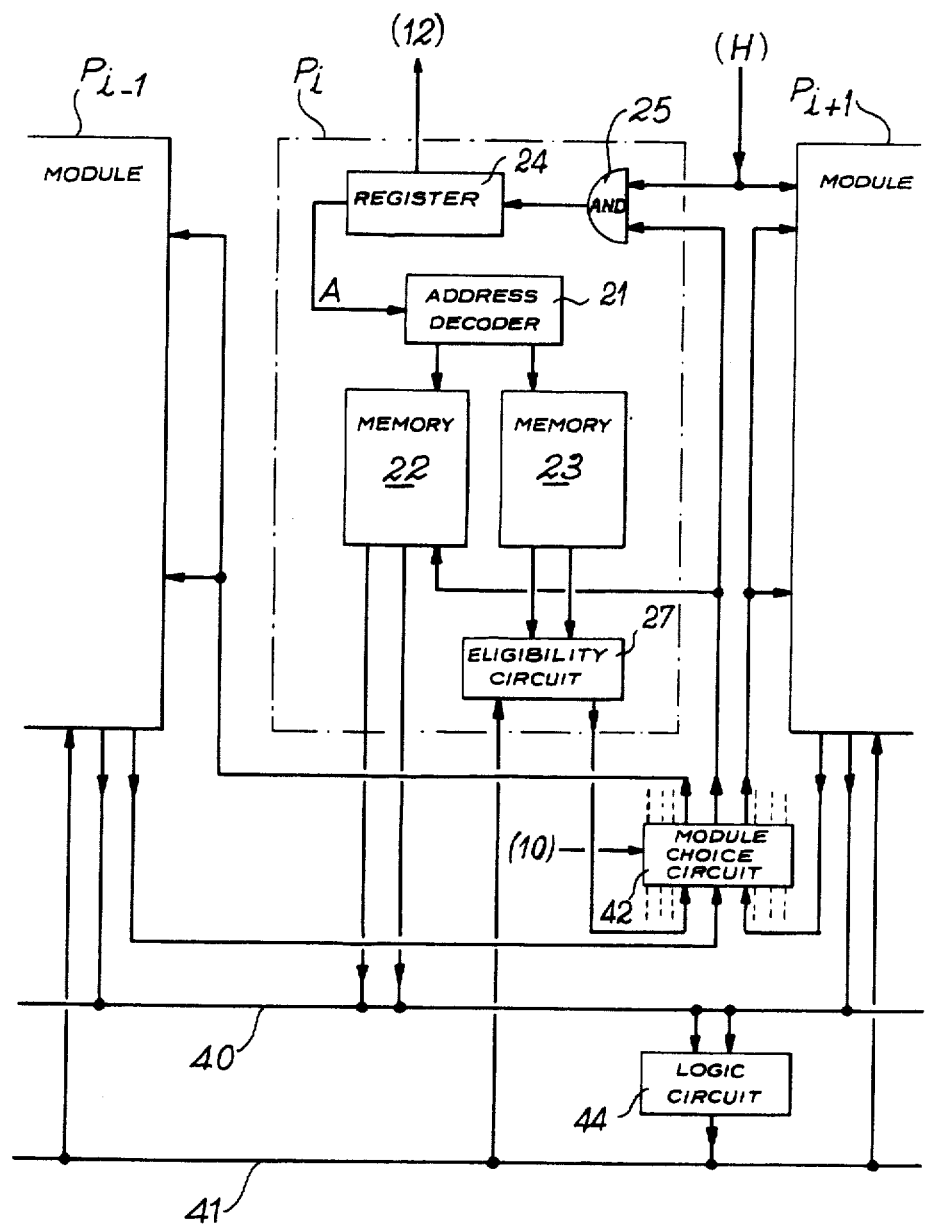
FIG. 2 shows a first embodiment of the sequencer employed in the system according to the invention.

FIG. 2 shows a first embodiment of the sequencer 11 of the previous figure.

Said sequencer mainly comprises:

a group of N identical circuits referred-to as modules and designated in the figure as $P_{i-1}$, $P_i$, $P_{i+1}$, each circuit being assigned to the control of resources which are necessary for a given process. The number (N) of modules therefore corresponds to the number of processes which can be performed by the system;

two buses 40 and 41 for transferring information relating to the state of the resources.

Each of the N modules comprises:

a register 24 in relation with the address generator 12, the function of which is to store the address A (obtained from the memory $3_C$ shown in FIG. 1) of the next instruction to be executed for the process corresponding to the module (P) considered;

an address decoder 21 (which can be integrated in the memory 22) for receiving the address A from the register 24;

a read-only memory 22 or "dead memory" of the ROM or PROM type which contains, at the address A, "restituted states" of the resources or in other words an indication of the state in which each resource will be found after execution of the next instruction to be executed. This state is one of the three following states:

resource occupied by the next instruction to be executed;

resource freed by this instruction;

resource which remains unchanged or in other words is not utilized by the process and the state of which is consequently not modified.

another read-only memory 23 which contains at the address A and in respect of the same instruction, the so-called "requested states" or in other words the state which must be assumed by each resource in order to carry out the next instruction to be executed.

By way of example, the binary representation of the restituted or requested states, wherein the left bit indicates that a process has no action on, or modifies, a resource (0 or 1, respectively), and the right bit indicates the status of the resource, i.e., available or indifferent (0) or occupied (1), must be as follows:

unchanged (or indifferent) resource: 00 freed (or free) resource: 10 occupied resource: 11.

In this representation, the bit located at the extreme left is representative of the recording of the state of the resource by the process and the bit located at the extreme right is representative of the state of the resource. It is noted that a total number of four bits is required for management of a resource.

Figure 3:
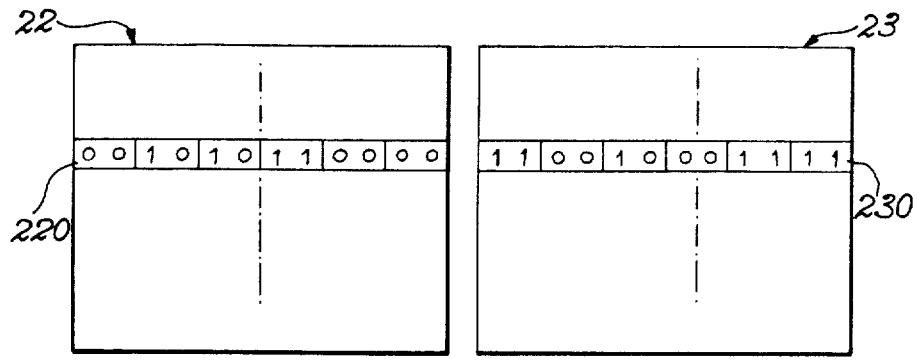
FIG. 3 is an explanatory diagram relating to FIG. 2.

To provide a further example, FIG. 3 illustrates the contents (address A) of the memories 22 and 23. There is shown in this figure the state of six resources at the address A in the case of each of the memories 22 (line 220) and 23 (line 230).

Figure 4:
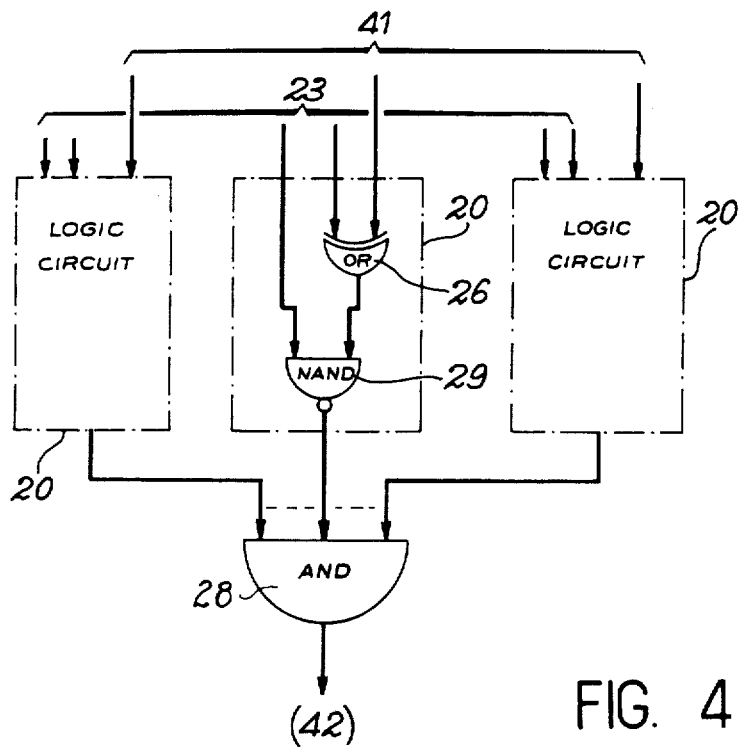
FIGS. 4 and 5 are the logical diagrams of two circuits of FIG. 2.

At each period of the clock H, the requested states of the resources for a given instruction are sent (in two bits) into an eligibility logic circuit 27, one embodiment of which is shown in FIG. 4.

Said circuit 27 receives two types of information: the states requested by the instruction considered and derived from the memory 23 and the effective states of the resources available on the bus 41 in accordance with a process which will be described hereinafter.

As shown in FIG. 4, the circuit 27 aforesaid comprises a logic circuit 20 in the case of each resource, the circuit 20 being constituted by:

a logical EXCLUSIVE-OR gate 26 which receives on the one hand the information (in a single bit) corresponding to the effective state of the resource and obtained from the bus 41 and, on the other hand, in the example of codification of the state of resources given above, the right-hand bit of the requested state of the resources derived from the memory 23;

a logical NAND-gate 29 which receives on the one hand the output information of the gate 26 and on the other hand the second bit obtained from the memory 23.

The output of the circuit 20 is a bit equal to 1 if the requested state is equal to the effective state or if the resource is indifferent, and a bit equal to 0 if the requested state is different from the effective state. In the event that said bit is equal to 1, the resource is therefore in the state required for execution of the instruction considered.

In order that said instruction and consequently the process to which it belongs may be eligible, all the resources must be in a suitable state. To this end, the outputs of the elements 29 of each circuit 20 are connected to the inputs of a logical AND-gate 28, a bit which is representative of the eligibility of the process being delivered at the output of said gate to a circuit 42.

Referring now to FIG. 2, it is apparent that the circuit 42 is common to all the modules; it receives on the one hand the indication of the processing operation to be performed by means of the management unit 10 and on the other hand the eligibility bit of each module; said circuit then becomes one of these latter in the event that a number of processes are eligible at the same time. Said circuit can be constituted, for example, by logical NOR-gates which give priority to the (eligible) module located at the extreme left.

The choice of a module by the circuit 42 is made effective by connection of the output of this latter to each module via AND-gates 25 placed within each module between the clock signal H and the register 24. This also has the effect of permitting transfer of the contents of the register 24 or in other words the address of the executable instruction to the element 12 which has the intended function of computing the addresses and permitting connections.

It should be noted that the element 12 can advantageously be divided into N identical modules which contain a set of instructions indicating the addresses and the connections to be established at the level of the execution means, each module of the element 12 being assigned to one module (P) of the sequencer in one-to-one correspondence.

The output of the circuit 42 is also employed at the level of each module (P) in order to permit transfer of the restituted states (in two bits for each resource) contained in the memory 22 to the bus 40.

The restituted states available on the bus 40 are transmitted (on two bits) to a logic circuit 44 which delivers a single effective resource-state bit to the bus 41.

Figure 5:
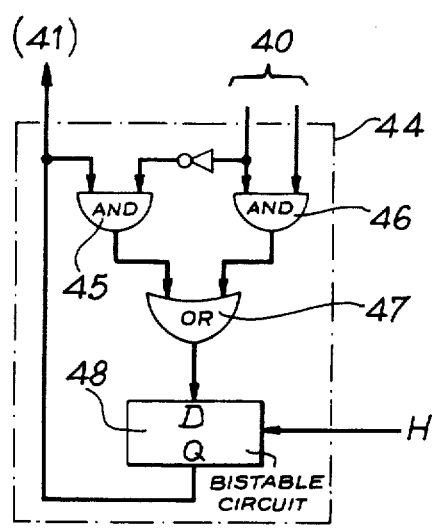

Said circuit 44 is shown in FIG. 5 in the case of a single resource, and comprises:

a first logical AND-gate 46 for receiving the two restituted-state bits derived from the bus 40;

a second AND-gate 45 for receiving the left-hand restituted bit after inversion and the output signal of a bistable circuit 48;

a logical OR-gate 47 for receiving the outputs of the two gates aforementioned;

the bistable circuit 48 of type D, namely in which the output Q is identical with the input D of the aforementioned clock period. The output Q of the bistable circuit 48 delivers to the bus 41 the bit representing the effective state of the resource.

Said circuit 44 makes it possible to obtain an effective-state bit which is identical either with its state during the preceding clock period or with the right-hand bit of the restituted state, with the representation convention given earlier, according as the left-hand bit is respectively equal to 0 or to 1.

In this embodiment as described in FIGS. 2 to 5, it should be noted that the choice of the instruction of a process is made externally of the memories 22 and 23 of the modules.

Figure 6:
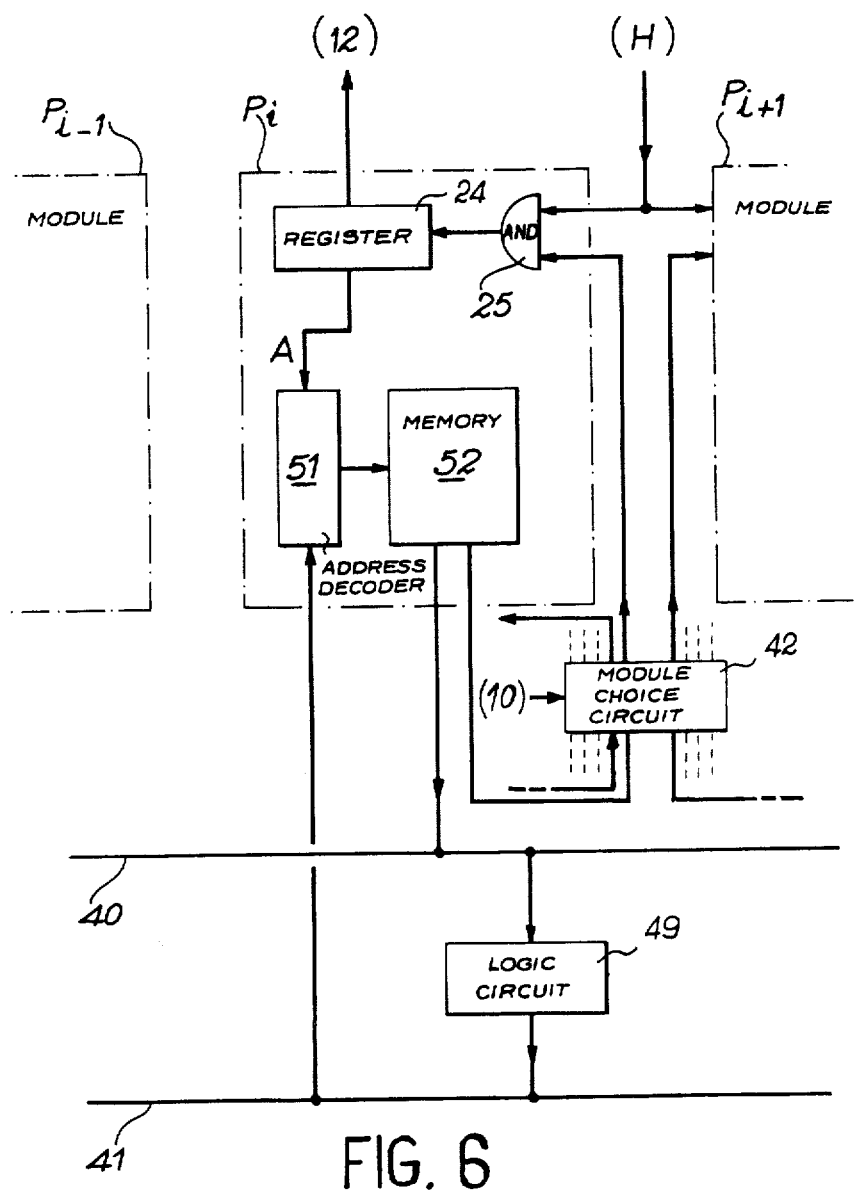
FIG. 6 shows a second embodiment of the sequencer.

FIG. 6 shows a second embodiment of the sequencer which is employed in the system according to the invention.

As in the previous instance, the sequencer comprises N modules ($P_{i-1}$, $P_i$, $P_{i+1}$) each corresponding to a pre-defined process, a restituted-state bus 40 and an effective resource-state bus 41. Each module comprises:

the register 24 which stores the address (A) of the instruction awaiting execution in the process under consideration;

an address decoder 51 for receiving the address A from the register 24 and indicating the effective states of the resources of the bus 41;

a memory 52 connected to the decoder 51 and containing all the possible combinations of the states of the different resources in respect of each instruction (address A) of the process under consideration.

In this configuration, the process is declared eligible if the effective states of the resources (delivered to the memory 52 via the decoder 51) are identical with the necessary (requested) states for execution of the instruction considered.

Figure 7:
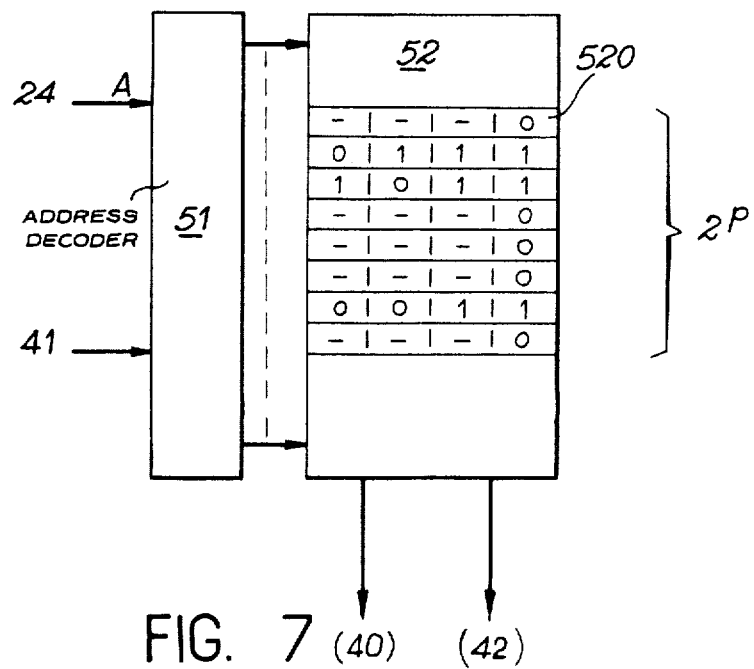
FIG. 7 is an explanatory diagram relating to FIG. 6.

FIG. 7 is an explanatory diagram showing one example of the contents of the memory 52 in the case of three resources.

There are shown in this figure the address decoder 51 and the memory 52. All the combinations of the possible states of the resources correspond in the memory 52 to each address A received by the decoder 51: in the example under consideration, there are eight possible combinations represented by eight lines in respect of three resources, the state of each resource being represented by one bit and, more generally, $2^p$ combinations of p bits in respect of p resources. Furthermore, an additional bit (520) or so-called partial eligibility bit is associated with each combination. Said bit is positioned at 1 at the time of programming of the memory 52 for the configurations of three preceding bits representing states which may be requested by the process managed by the module (P) considered. In the example of FIG. 7, only the second, third and seventh possible configurations correspond to states which are liable to be requested by the process considered. In this embodiment, the states requested by the resources therefore no longer specifically appear at the output of the memory as in the previous instance.

The effective-state information derived from the bus 41 is added to the address A in order to constitute the address of one of the lines of the memory 52. When the eligibility bit (520) of this line is equal to 1, the memory 52 delivers the indication of the restituted states of the resources to the bus 40 and delivers the indication of eligibility of the process to the circuit 42.

The operation of this structure is subsequently identical to the operation described with reference to FIG. 2 except for the fact that the circuit 44 is replaced by a circuit 49 of more simple design (based solely on D-type bistable devices) by virtue of the fact that both the effective states and the restituted states are expressed only on a single bit in this embodiment.

It is worthy of note that, in this embodiment as in the previous embodiment, elements such as the memories (22, 23 or 52) of the sequencer can be subdivided into two or more parts according to the technological conditions to be satisfied. Each memory accordingly controls a limited number of resources on condition that said memories are subsequently connected to the bases of AND-gates, for example, via suitable logic circuits.

The embodiment of FIG. 6 appears to offer a number of advantages over the embodiment of FIG. 2, viz:

reduction of the number of memory-output bits which are necessary in order to define the restituted states;

reduction of the number of logic circuits (the circuit 27 of FIG. 2 is no longer necessary);

increase in processing speed as a result of elimination of the circuit 27;

flexibility of the system: this latter is in fact readily reconfigurable for handling other processes since it is only necessary to modify the programming of the memories 52 and of the corresponding modules of the generator 12.

On the other hand, the increase in capacity which is necessary for the memories 52 represents a disadvantage.

By way of example, it is possible by means of the system according to the invention to achieve a high exchange power on the bus of the order of $10^7$ operations per second with a clock period of the order of 100 ns by virtue of a characteristic feature of said system in which management of the resources is carried out on the same scale as the clock period.

What is claimed is:

1. A system for processing signals by means of a finite number of processes, comprising:
    means for execution of the processes including plural resources including, plural memories, plural computing operators, and plural input-output couplers, said execution means being at least partly utilized in alternate sequence by a plurality of processes;
    first bus means connected to said memories, computing operators and input-output couplers for transfering computing information among said memories, computing operators and input-output couplers; and
    means for controlling the execution of the processes including a sequencer and an address and connection generator, said sequencer being connected to said address and connection generator, said address and connection generator being connected to said first bus means, said sequencer including a finite number of identical modules assigned to the processes in one-to-one correspondence, each module including means for storing requested states and restituted states, respectively indicative of the status of each resource before and after execution of each instruction of a respective process, said modules being connected by a common second bus means, said second bus means comprising a first bus to which are transmitted information indicative of the availability of said execution means, and a second bus to which are transmitted the restituted states of said execution means, and logical means for determining said information indicative of availability of said execution means based on said restituted states at each period of a clock, each of said modules comprising comparison means for comparing its requested states to said information indicative of availability of said executing means, the result of the comparison constituting eligibility data, said controlling means further comprising switch means for selectng one of said modules based on the eligibility data produced in the plural modules, the restituted states of said selected module being transferred onto said second bus.

2. A system according to claim 1, wherein said storing means of each module of the sequencer comprises:
    a first memory in which are written the requested states of the execution means for each of the instructions constituting the process corresponding to the module considered, and
    a second memory in which are written the restituted states of the execution means of each of the instructions aforesaid, said second memory being connected to said second bus.

3. A system according to claim 1, wherein said storing means of each module of the sequencer comprises:
    a memory in which all the configurations of possible states for the execution means are recorded in respect of each instruction constituting the process considered, each configuration being accompanied by eligibility data for indicating among all the configurations those which can be utilized by the process considered.

4. A system according to claim 3, wherein the information delivered by said first bus is associated with the address of the instruction awaiting execution in order to form the address of one of the configurations of the states of the execution means.

5. A system according to claim 1, wherein each module of the sequencer additionally comprises a register for storing the address of the instruction awaiting execution in the process considered, said register being controlled by said switch means.

* * * * *